United States Patent [19]

Muranishi

[11] 4,108,016
[45] Aug. 22, 1978

[54] DEVICE OF PREVENTING REVERSE TRANSMISSION OF MOTION IN A GEAR TRAIN

[75] Inventor: Kenichi Muranishi, Ena, Japan

[73] Assignee: Ricoh Watch Co., Ltd., Nagoya, Japan

[21] Appl. No.: 773,846

[22] Filed: Mar. 3, 1977

[30] Foreign Application Priority Data

Mar. 3, 1976 [JP] Japan .................................. 51-22993

[51] Int. Cl.² ........................ F16H 55/06; F16H 55/04
[52] U.S. Cl. .......................................... 74/462; 74/437
[58] Field of Search ................. 74/462, 460, 461, 457, 74/437

[56] References Cited

U.S. PATENT DOCUMENTS

| | | | |
|---|---|---|---|
| 3,496,791 | 2/1970 | Gabriel | 74/461 X |
| 4,041,794 | 8/1977 | Belot et al. | 74/462 X |

Primary Examiner—Leonard H. Gerin
Attorney, Agent, or Firm—Koda and Androlia

[57] ABSTRACT

A device for preventing reverse transmission of motion in a gear train including a drive and driven gear that are enmeshed together in a train of gears. The drive and driven gears are configured such that the rotative motion is transmitted from the drive gear to the driven gear but not from the driven gear to the drive gear due to a blockage created by the teeth of the drive and driven gear.

7 Claims, 3 Drawing Figures

4,108,016

DEVICE OF PREVENTING REVERSE TRANSMISSION OF MOTION IN A GEAR TRAIN

BACKGROUND OF THE INVENTION

1. Field of Invention

This invention relates to drive trains and more particularly to drive trains provided with a means for preventing the transmission of motion in the reverse direction.

2. Prior Art

With reference to gear trains utilized in time keeping devices, the motion under ordinary conditions is transmitted from the drive member such as a balance compensating motor, tuning fork motor, stepping motor, etc., to a side where the time in indicated by long and short hand. However, in adjusting the hands to set the time, motion is often transmitted from the indication side to the drive member. Motion transmitted in a reverse direction often causes changes in the state of the drive member, often causing the time keeping device to be out of order even when the device is set to work properly. For example, the hands being adjusted transmit motion reversely in the train of gears. When this motion is transmitted reversely in the train of gears and if the rotor of a stepping motor is turned by this transmitter reverse motion, the rotor will not rotate a full step when the initial pulse is applied.

To prevent the occurance of such an undesirable event, the prior art time keeping devices are equiped with a slip mechanism at the indication part or between the indication part and the drive train and a stop mechanism in the train of gears to prevent the transmission of reverse motion in the gear train. In many cases, the slip mechanism may consist of compressing some part of the cannon pinion and pressing the inner surface thereof into the outer periphery of the second wheel arbor. The stop mechanism, on the other hand, may consist of a mechanical means by which a limiting member is engaged with the gear train when a crown is drawn out or a magnetic means which magnetically locks the rotor member of the motor when the time piece is adjusted.

Such conventional mechanisms for preventing the transmission of reverse motion, however, presents several problems. For example, such mechanical means require a complex lever mechanism in order to properly actuate the limiting member and the magnetic means presents many difficulties in adjusting this slipping force of the above described slip mechanism.

SUMMARY OF THE INVENTION

Accordingly, it is the general object of the present invention to provide a device for preventing the transmission of motion in the reverse direction in the gear train.

It is another object of the present invention to provide a device for preventing the transmission of motion in the reverse direction in a gear train that can be easily incorporated into time keeping devices.

It is yet another object of the present invention to provide a device for preventing the transmission of motion in the reverse direction in the gear train which does not require any clumsy adjustment operations.

It is still another object of the present invention to provide a device for preventing the transmission of motion in the reverse direction in a gear train that is simply, easy to manufacture and low in cost.

In keeping with the principals of the present invention, the objects are accomplished by a unique device for preventing the transmission of motion in the reverse direction in a gear train. The device includes a drive and a driven gears that are enmeshed together in a train of gears. The drive and driven gears are configured such that the rotative motion is transmitted from the drive gear to the driven gear but not from the driven gear to the drive gear. The driven gear is prevented from transmitting rotational motion to the drive gear by a blockage created by the teeth of the drive and driven gears. In the preferred embodiment, the teeth of the drive gear are broadened towards the tip in thickness thereof and the tip of the teeth are substantially flat.

BRIEF DESCRIPTION OF THE DRAWINGS

The above mentioned and other features and objects of the present invention will become more apparent per reference to the following description taken in conjunction with the accompanying drawings wherein reference numerals denote like elements, and in which.

DETAILED DESCRIPTION OF THE INVENTION

Referring more particularly to the drawings, shown in the figures is a device for preventing the transmission of reverse motion in the reverse direction in accordance with the teachings of the present invention as applied to the gear train of a time piece of the type including a stepper motor. The stepper motor has a rotor that is turned one pole by a pulse produced every second. The rotor has six magnetic poles and has a rotor pinion 1 integrally formed with the rotor. The rotor pinion 1 has six teeth which correspond to the number of magnetic poles of the rotor. The rotor pinion 1 constitutes a gear in the gear train of the time piece and meshes with the neighboring fourth wheel 2. The fourth wheel 2 has 60 teeth. The fourth wheel 2 further meshes with a third wheel which in turn meshes with a second wheel to form a gear train. In this way rotation of the stepper motor is transmitted to the cannon pinion and to the cannon wheel of the indication part to advance the indication part to indicate the time. In the present invention, the rotor pinion 1 and the fourth wheel 2 constitutes the device for preventing the transmission of motion in the reverse direction. That is, the rotor pinion 1 is the drive gear and has teeth whose thickness increases towards the tip thereof and which has a flat surface 1a formed on the tip of each tooth. The fourth wheel 2 which is the driven gear has thin teeth. In this way, the rotor pinion 1 and the fourth wheel 2 are configured such that motion is transmitted from the rotor pinion 1 to the fourth wheel 2 but the fourth wheel 2 cannot transmit motion to the rotor pinion 1 due to the formation of a blockage between the two gears.

Figure 1:
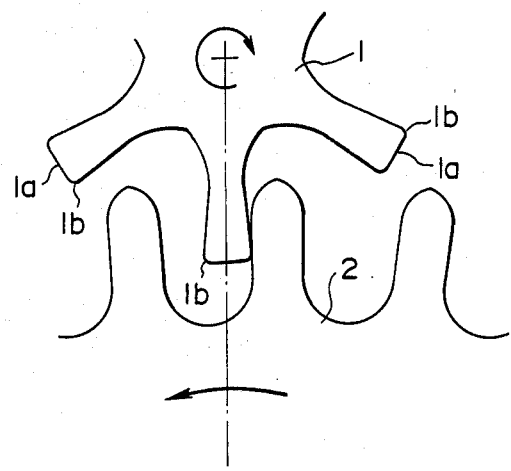
FIG. 1 is a partial view of the gear train of a time piece of the type utilizing a stepper motor provided with a device for preventing the transmission of motion in the reverse direction illustrating the ordinary operation of the rotor pinion engaging with the fourth wheel.
Figure 2:
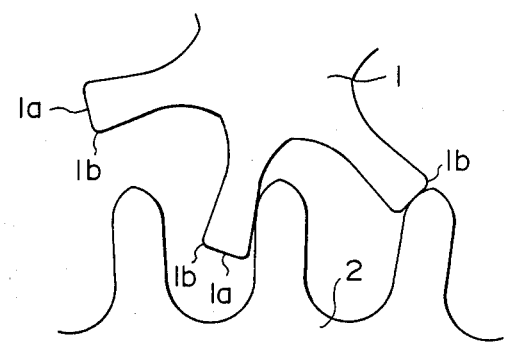
FIG. 2 is a partial view of the gear train of a time piece of the type having a stepper motor provided with a device for preventing the transmission of motion in reverse direction illustrating that when the fourth wheel is turned in a counter clockwise direction when the hands are adjusted, a blockage formed with respect to the rotor pinion so that rotative force is not transmitted to the rotor pinion.
Figure 3:
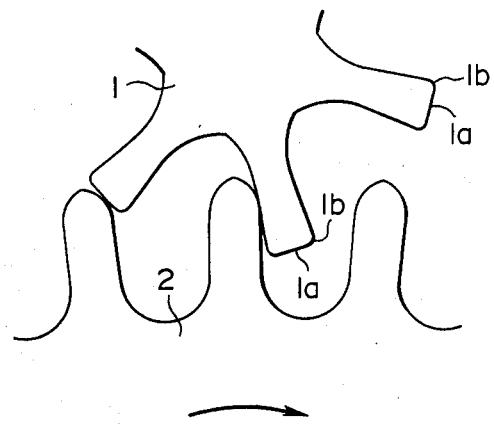
FIG. 3 is a partial view of a time piece of the type utilizing a stepper motor provided with a device for preventing the transmission of motion in reverse direction illustrating that when the fourth wheel is turned in a clockwise direction when the hands are being adjusted, a blockage is formed with respect to the rotor pinion so that rotative force cannot be transmitted to the rotor pinion.

FIG. 1 illustrates the state in which the rotor pinion 1 is turning in the clockwise direction under ordinary conditions and transmits its rotative force to the fourth wheel 2. FIGS. 2 and 3 show the state in which an obstruction is established between the two gears when the hands are being adjusted. In FIG. 2, rotation is prevented from the fourth wheel 2 to the rotor pinion 1 when the fourth wheel 2 is turned in the counter clockwise direction and in FIG. 3, rotation is prevented from the fourth wheel 2 to the rotor pinion 1 when the fourth wheel 2 is turned in the clockwise direction.

In the time piece utilizing the present invention, the rotor of the stepper motor under ordinary conditions only turns in one direction. The rotation of the rotor is transmitted to the fourth wheel to the other rotor pinion 1 as shown in FIG. 1. If the crown is drawn out for adjusting the hands, production of drive pulses is stopped and the rotation of the rotor is stopped. If the crown is turned, the rotation of the crown is transmitted to the cannon pinion via the minute wheel, and transmitted to the second wheel via a slip mechanism composed of the cannon pinion and the second wheel arbor. The rotation of the second wheel is transmitted to the third wheel and the rotation of the third wheel is transmitted to the fourth wheel. As shown in FIG. 2, when the crown is turned and the fourth wheel turns in a counter clockwise direction, the teeth of the fourth wheel comes in contact with the flat surface 1a on the tip of the teeth of the rotor pinion 1, as shown in FIG. 2. Similarly, when the crown is turned such that the fourth gear rotates in a clockwise direction, a tooth of the fourth gear 2 hits the flat surface 1a of the rotor pinion 1 thereby causing a blockage and preventing the transmission of rotational energy to the rotor pinion 1. Since the rotation of the fourth wheel 2 is blocked in both the clockwise and counter clockwise direction by the teeth of the rotor pinion 1, the rotation produced by the turn of the crown undergoes slipping by means of the slip mechanism provided between the cannon pinion in the second wheel arbor and the rotation is not transmitted to the gear train consisting of the second wheel, third wheel and fourth wheel.

As described above, the device for preventing the transmission of motion in reverse direction in the present invention is accomplished by the gears themselves thereby obviating the need for a complex mechanism for actuating the limiting member and liberating the slip mechanism from the complex adjustment operation. Furthermore, it should be apparent that by employing the device of the present invention, the transmission of motion in the reverse direction can easily be prevented in the gear train. In addition, wherefore example, relatively large hands are employed, when an intense shock is applied to the time piece during normal operation, the train of gears is tended to be turned by the weight of the hands. But if the time piece is equipped with the device for preventing the transmission of motion in the reverse direction in the gear train of the present invention, the transmission of such motion in the reverse direction is prevented and a defect in the operation of the time piece is prevented.

It should be apparant that even though the foregoing embodiment has been described in terms of a rotor of a stepper motor having six pole pieces, a rotor may have two magnetic poles instead of six. Furthermore, the number of teeth on the rotor pinion 1 in the fourth wheel 2 need not of course be limited to six or 60 teeth. In addition, even though the embodiment has been described with the rotor pinion 1 and the fourth wheel 2 forming the device for preventing the transmission of motion in the reverse direction, it is within the scope of the present invention that the other gears of the gear train may be formed in a similar manner as the rotor pinion 1 and fourth wheel 2 to create the device for preventing the transmission of motion in the reverse direction. Furthermore, the slip mechanism need not necessarily be provided between the cannon pinion in the second wheel arbor but may be provided at any place in the gear train so long as it is provided in that portion of the gear train located between the device for preventing the transmission of motion in the reverse direction in the indicating part. Also, the above embodiment has been described in terms of a time piece having a stepper motor but may also be applied to time pieces utilizing balance wheels or tuning forks. In addition, even though the present invention has been described in terms of time pieces, it may also be applied to similar gear trains such as for the transmission of motion as applied to a timer.

Moreover, it is necessary to so design the device that the access of the action of the reverse transmission preventing gear on the driven side passes through or near the rotating axis of the reverse transmission preventing gear on the drive side so that the obstruction will not erroneously work. For this purpose, it is desired that the flat surface 1a at the tip of the tooth of the reverse transmission preventing gear on the driven side is formed flat. Furthermore, to eliminate the competition, the corners 1b of the flat part 1a should be shaped round to an extent that it does not adversely affect the operation of the teeth as an obstruction. If the reverse transmission preventing gear on the drive side is made in small diameter, the meshing tends to become separated. As the meshing tends to become separated, the obstruction created by the teeth loses its reliability. It is, therefore, necessary to make the reverse transmission preventing gear on the drive side as large in diameter as possible. Furthermore, with the reverse transmission preventing gear on the drive side being made as large in diameter as possible, the teeth should be formed as thick as possible that does not impose a problem during production. Similarly, the teeth of the reverse transmission prevention gear on the driven side should be formed as thin as possible. Since the obstruction is shortened as a result of the teeth of the driven gear being formed thin, the reverse transmission preventing gear on the driven side should be made as small in diameter as possible to increase the reliability of operation of the obstruction.

In all cases it is understood that the above described embodiments are merely illustrative of but one of the many possible specific embodiments which represent the applications of the principles of the present invention. Numerous and varied arrangements can be rarely devised by those skilled in the art in accordance with these principals without departing from the spirit and scope of the invention.

I claim:

1. A device for preventing reverse transmission of motion in a gear train comprising a drive gear having teeth which are broadened towards the tip and a driven gear meshed together with said drive gear whereby rotative motion is transmitted from said drive gear to said driven gear but not from said driven gear to said drive gear due to a blockage created by the teeth of said drive and driven gears.

2. A device for preventing reverse transmission of motion in a gear train comprising a drive gear having teeth with tips which are substantially flat and a driven gear meshed together with said drive gear whereby rotative motion is transmitted from said drive gear to said driven gear but not from said driven gear to said drive gear due to a blockage created by the teeth of said drive and driven gears.

3. A device according to claim 2 wherein the corners of the substantially flat tips of the teeth of said drive gear are rounded.

4. A device for preventing reverse transmission of motion in a gear train comprising a drive gear wherein the diameter of the tips of the teeth of the drive gear is increased to a value that the teeth do not interfere with the normal operation of the gear train and a driven gear meshed together with said drive gear whereby rotative motion is transmitted from said drive gear to said driven gear but not from said driven gear to said drive gear due to a blockage created by the teeth of said driven gears.

5. A device for preventing reverse transmission of motion in a gear train comprising a drive gear and a driven gear meshed together with said drive gear, said driven gear having teeth with tips which are thin and of a small diameter whereby rotative motion is transmitted from said drive gear to said driven gear but not from said driven gear to said drive gear due to a blockage created by the teeth of said drive and driven gears.

6. A device according to claim 1 wherein said drive and driven gears comprise the rotor pinion and fourth wheel of a time piece.

7. A device for preventing reverse transmission of motion in a gear train comprising:
- a drive gear, said drive gear having teeth which are broadened towards the tip and tips which are substantially flat; and
- a driven gear meshed together with said drive gear, said driven gear having teeth which are thin with tips which are of a small diameter;
- whereby rotative motion is transmitted from said drive gear to said driven gear but not from said driven gear to said drive gear due to a blockage created by the teeth of said drive and driven gears.

* * * * *